United States Patent
Lei et al.

(10) Patent No.: US 9,940,695 B2
(45) Date of Patent: Apr. 10, 2018

(54) METHOD FOR ENSURING PERFECT STITCHING OF A SUBJECT'S IMAGES IN A REAL-SITE IMAGE STITCHING OPERATION

(71) Applicant: MULTIMEDIA IMAGE SOLUTION LIMITED, Dublin (IE)

(72) Inventors: Hua Lei, Hangzhou (CN); Jin Wang, Hangzhou (CN)

(73) Assignee: MULTIMEDIA IMAGE SOLUTION LIMITED, Dublin (IE)

( * ) Notice: Subject to any disclaimer, the term of this patent is extended or adjusted under 35 U.S.C. 154(b) by 50 days.

(21) Appl. No.: 15/247,974

(22) Filed: Aug. 26, 2016

(65) Prior Publication Data
US 2018/0061006 A1    Mar. 1, 2018

(51) Int. Cl.
*G06K 9/00* (2006.01)
*G06T 3/40* (2006.01)
*G06T 5/50* (2006.01)
*G06T 7/00* (2017.01)
*G06T 3/00* (2006.01)

(52) U.S. Cl.
CPC .......... *G06T 3/4038* (2013.01); *G06T 3/0068* (2013.01); *G06T 5/50* (2013.01); *G06T 7/003* (2013.01); *G06T 2207/10004* (2013.01); *G06T 2207/20221* (2013.01); *G06T 2207/30201* (2013.01)

(58) Field of Classification Search
CPC . G06T 2207/20212; G06T 2207/20221; G06T 3/4038; H04N 5/23219

USPC ......................................................... 382/284
See application file for complete search history.

(56) References Cited

U.S. PATENT DOCUMENTS

| | | | | |
|---|---|---|---|---|
| 8,717,912 | B2* | 5/2014 | Wakabayashi | H04B 17/336 370/252 |
| 8,824,735 | B2* | 9/2014 | Pham | G06T 7/32 348/208.13 |
| 8,848,034 | B2* | 9/2014 | Fukuzawa | G03B 17/28 348/36 |
| 9,047,692 | B1* | 6/2015 | Seitz | G06T 3/4038 |
| 9,251,598 | B2* | 2/2016 | Wells | G06T 7/2093 |
| 2006/0171687 | A1* | 8/2006 | Aiso | G06T 5/50 386/230 |
| 2006/0181619 | A1* | 8/2006 | Liow | G03B 17/02 348/239 |
| 2007/0025723 | A1* | 2/2007 | Baudisch | G03B 13/02 396/287 |

(Continued)

*Primary Examiner* — Wesley Tucker
(74) *Attorney, Agent, or Firm* — Bacon & Thomas, PLLC

(57) ABSTRACT

The present invention is to provide a method for ensuring perfect stitching of a subject's images in a real-site image stitching operation, which enables an electronic device to read two real-site images which are taken respectively of different parts of the same site and each of which has an overlap area of a common subject; to determine and choose an optimal stitching path bypassing the subject; to construct a mask diagram such that, within a difference diagram of the overlap areas, the farther a pixel on one side of the optimal stitching path is from the optimal stitching path, the greater the pixel's value, and the farther a pixel on the other side of the optimal stitching path is from the optimal stitching path, the smaller the pixel's value; and to stitch and fuse the overlap areas together through a fusion algorithm, with the mask diagram serving as a weight.

10 Claims, 12 Drawing Sheets

(56) References Cited

U.S. PATENT DOCUMENTS

| | | | | |
|---|---|---|---|---|
| 2007/0081081 A1* | 4/2007 | Cheng | .................... | G06T 3/4038 |
| | | | | 348/218.1 |
| 2010/0054628 A1* | 3/2010 | Levy | ..................... | G06T 3/4038 |
| | | | | 382/284 |
| 2011/0141300 A1* | 6/2011 | Stec | ...................... | G06T 3/4038 |
| | | | | 348/222.1 |
| 2012/0154520 A1* | 6/2012 | Putraya | ................. | G06T 3/4038 |
| | | | | 348/36 |
| 2017/0287184 A1* | 10/2017 | Pettersson | ............... | G06T 11/60 |

* cited by examiner $$I_{\text{blend}} = I_a(1 - I_{mask}) + I_b I_{mask}$$

US 9,940,695 B2

METHOD FOR ENSURING PERFECT STITCHING OF A SUBJECT'S IMAGES IN A REAL-SITE IMAGE STITCHING OPERATION

FIELD OF THE INVENTION

The present invention relates to images stitching method, more particularly to a method for ensuring perfect stitching of a subject's images in a real-site image stitching operation, which enables an electronic device to read two real-site images which are taken respectively of different parts of the same site and each of which has an overlap area of a common subject; to determine and choose an optimal stitching path bypassing the subject; to construct a mask diagram such that, within a difference diagram of the overlap areas, the farther a pixel on one side of the optimal stitching path is from the optimal stitching path, the greater the pixel's value, and the farther a pixel on the other side of the optimal stitching path is from the optimal stitching path, the smaller the pixel's value; and to stitch and fuse the overlap areas together through a fusion algorithm, with the mask diagram serving as a weight. Thus, the method of the present invention enables almost complete alignment of the pixels in the overlap areas that correspond to the subject, hence making a nearly perfect panorama possible.

BACKGROUND OF THE INVENTION

Recently, as smartphones and digital still cameras become more and more affordable, almost everybody has one such device. When traveling, therefore, people tend to take pictures of the beauty in sight with the smartphones or digital still cameras they carry with them as a souvenir to remember the scenery by. In particular, many new models of smartphones and digital still cameras are provided with a "panorama function" for taking panoramic photos. A user only has to switch such a smartphone or digital still camera to the "panorama mode" and perform a "horizontal scanning" operation, taking images of different parts of the same site, and a panorama will be produced by a stitching operation of the image processing software installed on the smartphone or digital still camera, allowing the user to faithfully record the grandeur of a magnificent view.

Generally, software designed to produce a panorama by stitching together at least two images taken respectively of different parts of the same site—be it image processing software pre-installed on a smartphone or digital still camera, or commercially available image editing software to be installed on an electronic device (e.g., a computer)—includes the following stitching procedure to be performed by the smartphone, digital still camera, computer, or like electronic device (hereinafter collectively referred to as the electronic device):

(1) It must be understood in the first place that a panorama is in fact an assembly of a number of images. To start with, a plurality of images are taken horizontally and consecutively of different parts of the same site with a smartphone or digital still camera. Take a common smartphone or digital still camera for example. The view angle of the lens to be used is typically 60 degrees, so at least eight images must be taken in order to produce a 360-degree panorama. Basically, the more images are stitched together, the better the result. When producing a 360-degree panorama, referring to FIG. 1, it is crucial that each constituent image has an appropriate portion reserved as an "overlap area", and the larger the overlap area, the better the stitching result. This is especially true when a lens of a relatively short focal length (e.g., 18 mm, 28 mm, etc.) is used, for it is difficult to perfectly stitch together images with a strong sense of perspective, and a more natural stitching result can be obtained in that case by taking more images and making the overlap area as large as possible. To ensure that a 360-degree panorama is attainable, therefore, it is common practice to take more than ten images horizontally and consecutively of different parts of the same site using a smartphone or digital still camera.

(2) The electronic device sequentially adjusts the brightness and hues of each image with the image processing or editing software installed thereon, in order to achieve consistency in brightness and hue.

(3) Then, the electronic device stitches together the overlap areas of each two adjacent images with the image processing or editing software.

(4) Once the overlap areas are stitched together and fused, the user has to trim the four sides of the resulting image with the cutting tool of the image processing or editing software in order to complete the panorama.

When the electronic device performs the aforesaid stitching and fusing operation on at least two real-site images, errors of the image registration algorithm or parallax in the real-site images tends to hinder perfect registration of the images in the corresponding overlap areas, or stitched areas, of the real-site images, resulting in misaligned images, ghost images, or similar defects in the panorama obtained. While it may be acceptable to have a misaligned image or ghost image in areas that are not intended to be the focus of attention, the overall visual effect of the panorama will be seriously impaired if such a defect takes place where viewers' attention is intended or inevitable (e.g., on a human face, human figure, flower, car, building, or other visual target in which a viewer may take interest).

The following paragraphs provide a detailed description of how commercially available image processing or editing software stitches at least two real-site images together:

(1) First, the electronic device to which the software is applied reads the at least two real-site images and chooses a stitching path for the overlap areas of the real-site images according to the image processing or editing software. If a linear fusion/stitching algorithm is used, referring to FIG. 2, in which images $I_A$ and $I_B$ are registered overlap-area images of the two real-site images, the process of choosing the stitching path begins by calculating the difference diagram $\Delta I = \text{abs}(I_A - I_B)$ of the two overlap-area images $I_A$ and $I_B$.

(2) Then, a minimum-difference path S in the difference diagram is found using a dynamic programming or graph cut algorithm. More specifically, all the pixels on each of a plurality of different paths in the difference diagram $\Delta I$ are added up to obtain the difference of each path, and the minimum-difference path S is determined by comparing the differences of the paths. The minimum-difference path S is defined as the path with the smallest difference of all the different paths that run through the overlap-area images $I_A$ and $I_B$.

(3) Following that, a mask diagram $I_{mask}$ is constructed, the process of which basically involves assigning the value 0.5 to each pixel on the minimum-difference path S such that the farther a pixel in the difference diagram $\Delta I$ and to the right of the minimum-difference path S is from the minimum-difference path S, the greater (or the closer to 1.0) the pixel's value, and the farther a pixel in the difference diagram $\Delta I$ and to the left of the minimum-difference path S is from the minimum-difference path S, the smaller (or the closer to 0.0) the pixel's value.

(4) Once the mask diagram $I_{mask}$ is obtained, the overlap-area images $I_A$ and $I_B$ are fused using a linear fusion algorithm or a Laplace pyramid fusion algorithm. The linear fusion algorithm is the simpler of the two and is carried out by weighting the to-be-fused overlap-area images $I_A$ and $I_B$ by the mask diagram $I_{mask}$ and then performing linear superimposition to form a fused image $I_{blend} = I_A(1-I_{mask}) + I_B I_{mask}$. Please note that the minimum-difference path S obtained is also referred to as the "stitching path".

Since the foregoing stitching operation does not take into account whether or not the overlap-area images $I_A$ and $I_B$ respectively contain images of a portion, or the entirety, of a common subject that compels attention (e.g., a human face, human figure, flower, car, building, or like visual target), the minimum-difference path S obtained is very likely to run through the subject. If, for example, the subject is a human face as shown in FIG. 3, in which $I_a$ and $I_b$ are registered overlap-area images of the two real-site images, the stitching path (or minimum-difference path, as indicated by the zigzag line on the right of FIG. 3) in the difference diagram $\Delta I_{ab}$ of $I_a$ and $I_b$ may pass through the face such that, upon completion of the image stitching and fusing process (see FIG. 4) and due to registration errors between the images $I_a$ and $I_b$, a ghost image can be seen on the nose (as shown in the dashed-line circle on the right of FIG. 4), where the stitching path traverses. Thus, the subject of interest or focus of attention (i.e., the face) in the resulting panorama is defective in terms of visual effect, which compromises the image quality of the panorama significantly.

Moreover, referring to FIG. 5, in cases where the real-site images have relatively small overlap areas $I_m$ and $I_n$ but the image of the to-be-protected subject (e.g., the image of a human figure) occupies a major portion of each overlap area, it is extremely difficult for the minimum-difference path S determined by either of the aforesaid minimum-difference path algorithms to bypass the image of the subject (e.g., the image of the human figure). If the overlap areas $I_m$ and $I_n$ are directly stitched together and fused after whole-area registration, there must be misaligned images or ghost images in a local area of interest (e.g., a human face) of the fused image $I_{blend}$ as a result of matching errors, parallax, or the like, thus substantially lowering the image quality of the panorama.

According to the above, it is imperative to protect the subject of interest in the overlap areas of the real-site images to be stitched together and fused. The issue to be addressed by the present invention, therefore, is to design an image stitching method for producing a panorama and to ensure that, when an electronic device applies the method and stitches at least two real-site images together to produce a panorama, the images of a common subject in the overlap areas of the real-site images will be perfectly stitched together.

BRIEF SUMMARY OF THE INVENTION

It is an objective of the present invention to provide a method for ensuring perfect stitching of a subject's images in a real-site image stitching operation. The method is applied to an electronic device (e.g., a smartphone, digital still camera, or computer) so that, after reading at least two real-site images which are taken respectively of different parts of the same site and each of which has an overlap area including an image of a portion, or the entirety, of a common subject (e.g., a human figure or human face), the electronic device performs the following steps on the real-site images in the stitching operation. To stitch the overlap areas together, the first step is to choose the optimal (or least costly) stitching path. The optimal stitching path bypasses the subject in each overlap area so as to protect the subject during the image stitching operation. More specifically, the subject's respective positions in the overlap areas are calculated with a subject detection algorithm (e.g., a human figure or human face detection algorithm). Then, the optimal stitching path is determined by applying an optimal path algorithm (e.g., a dynamic programming or graph cut algorithm) and by assigning a relatively large error to the subject in the overlap areas. The rationale is to ensure that all the paths passing through the subject will be determined as the worst paths and excluded by the optimal path algorithm, and that therefore the optimal stitching path obtained is one that does not pass through the subject. Next, a mask diagram is constructed such that, within a difference diagram of the overlap areas, the farther a pixel on one side of the optimal stitching path is from the optimal stitching path, the greater the pixel's value, and the farther a pixel on the other side of the optimal stitching path is from the optimal stitching path, the smaller the pixel's value. Lastly, the overlap areas are stitched together and fused through a fusion algorithm (e.g., a linear fusion or Laplace pyramid fusion algorithm), with the mask diagram serving as a weight. The foregoing image stitching and fusing operation enables almost complete alignment of the pixels in the overlap areas that correspond to the subject, hence making a nearly perfect panorama possible.

Another objective of the present invention is to make sure that the aforesaid method can protect the subject (e.g., a human figure) even when the subject's image occupies most of the overlap areas and is therefore difficult to be bypassed by the optimal stitching path determined via the optimal path algorithm. To achieve this objective, whole-area registration is performed on the areas within the overlap areas that are occupied by the subject (e.g., a human figure). As some local areas of interest (e.g., those showing a human face) in the subject-occupied areas may have problem being perfectly aligned in the whole-area registration process due to parallax, errors in whole-area registration, and so on, the method further includes performing localized registration on small image sections that correspond respectively to the local areas of interest (e.g., those showing a human face) in the subject-occupied areas. The algorithm for localized registration may be a block-matching algorithm based on minimization of a brightness error or an image registration algorithm based on the matching of characteristic points. After that, the amounts by which each corresponding pair of pixels in the overlap areas are to be shifted in the stitching operation are determined according to the results of localized registration, and the corresponding pixels are adjusted in position in accordance with the amounts determined (also referred to herein as the shifting amounts). Consequently, with each corresponding pair of pixels moved from their original positions to more consistent positions, the subject's image in each of the overlap areas is deformed. The deformed overlap areas are then stitched together and fused through an image fusion algorithm to produce a nearly perfect panorama. Now that each corresponding pair of pixels of the subject's images in the overlap areas are almost perfectly aligned after the image stitching and fusing process is completed, not only is the subject in the panorama free of misaligned images and ghost images, but also the focus of attention in the panorama retains perfect visual effect. When magnified, the details of the subject's image in the panorama are practically flawless, even to the extent that a viewer may be moved. It is this kind of panorama that deserves to be kept for a lifetime.

BRIEF DESCRIPTION OF THE SEVERAL VIEWS OF THE DRAWINGS

The above and other objectives, as well as the technical features and effects, of the present invention can be better understood by referring to the following detailed description in conjunction with the accompanying drawings, in which.

DETAILED DESCRIPTION OF THE INVENTION

As stated above, the conventional image stitching process often leads to imperfect registration of the images in the overlap areas (or stitched areas) due to errors in the image registration algorithm or parallax, resulting in misaligned images, ghost images, or other defects. If the subject of interest or focus of attention is shown in the stitched areas, such defects are bound to damage the overall visual effect of the panorama seriously. During the stitching process, therefore, it is necessary to protect the subject in the stitched areas, which is exactly the issue to be addressed by the present invention.

Figure 6:
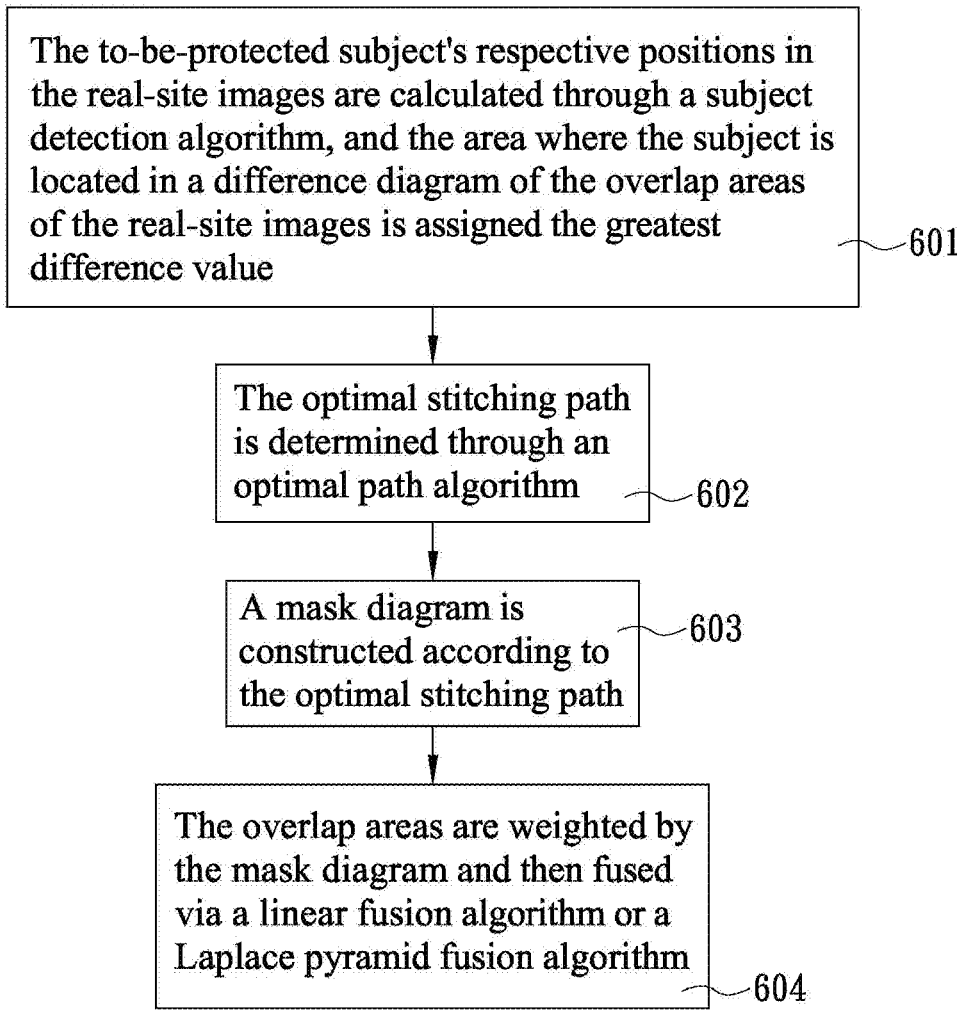
FIG. 6 is the flowchart of an embodiment of the present invention.

The present invention provides a method for ensuring perfect stitching of a subject's images in a real-site image stitching operation. The method is applied to an electronic device (e.g., a smartphone, digital still camera, or computer) in order for the electronic device to perform, after reading at least two real-site images taken respectively of different parts of the same site, a stitching operation on the real-site images according to the steps detailed below (see FIG. 6). Each real-site image has an overlap area (also referred to herein as a stitched area) including an image of a portion, or the entirety, of a common subject (e.g., a human face, human figure, flower, car, building, or other visual target in which a viewer may take interest or to which a viewer tends to pay attention). Hereinafter, a human face is used by way of example as the common subject in the overlap areas of the real-site images.

Figure 7:
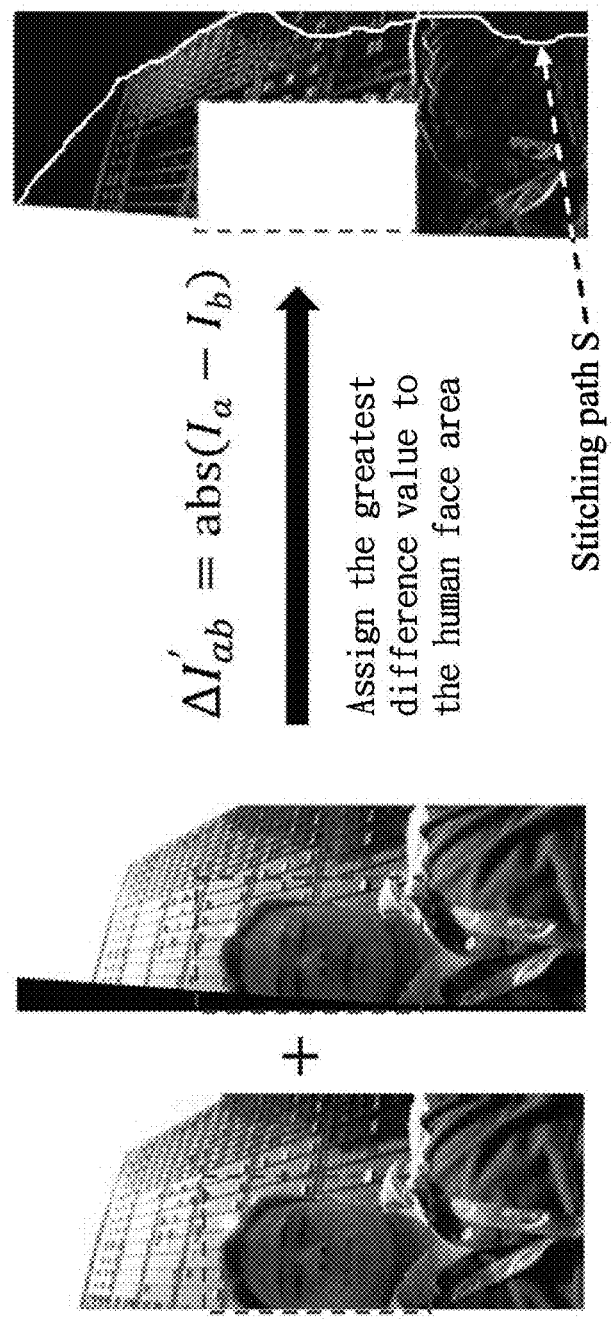
FIG. 7 schematically shows how the present invention assigns the largest error to a human face area when determining the optimal stitching path.

(601) Referring to FIG. 7, to protect the subject (e.g., a human face) in the overlap areas $I_a$ and $I_b$ of the real-site images, the stitching operation to be performed on the overlap areas $I_a$ and $I_b$ begins by choosing the optimal stitching path S (e.g., the zigzag line on the right of FIG. 7). The optimal stitching path S must bypass where the subject lies in each overlap area $I_a$ or $I_b$, in order to protect the subject during the image stitching process. To start with, a subject detection algorithm (e.g., a human face detection algorithm) is used to calculate the subject's respective positions in the overlap areas $I_a$ and $I_b$. Then, on a difference diagram $\Delta I'_{ab}$=abs $(I_a - I_b)$ of the overlap areas $I_a$ and $I_b$, the greatest difference value is assigned to the area where the subject to be protected is located (e.g., the blank area on the right of FIG. 7). This ensures that the optimal stitching path S obtained will not pass through the subject to be protected.

(602) The optimal stitching path S is determined through an optimal path algorithm such as a dynamic programming or graph cut algorithm. Since the subject's respective positions in the overlap areas $I_a$ and $I_b$ have been found using the subject detection algorithm, and the area where the subject is located is assigned a larger error than the other areas, the optimal path algorithm will automatically regard all paths passing through the subject as the worst paths and exclude such paths while assessing potential optimal stitching paths. The assessment continues until the optimal stitching path S, which bypasses the subject, is found.

(603) Then, a mask diagram $I_{mask}$ is constructed. Basically, referring again to FIG. 7, all the pixels on the optimal stitching path S in the difference diagram $\Delta I'_{ab}$ are assigned the value 0.5 such that the farther a pixel in the difference diagram $\Delta I'_{ab}$ and to the right of the optimal stitching path S is from the optimal stitching path S, the greater (or more particularly the closer to 1.0) the pixel's value, and the farther a pixel in the difference diagram $\Delta I'_{ab}$ and to the left of the optimal stitching path S is from the optimal stitching path S, the smaller (or more particularly the closer to 0.0) the pixel's value.

Figure 8:
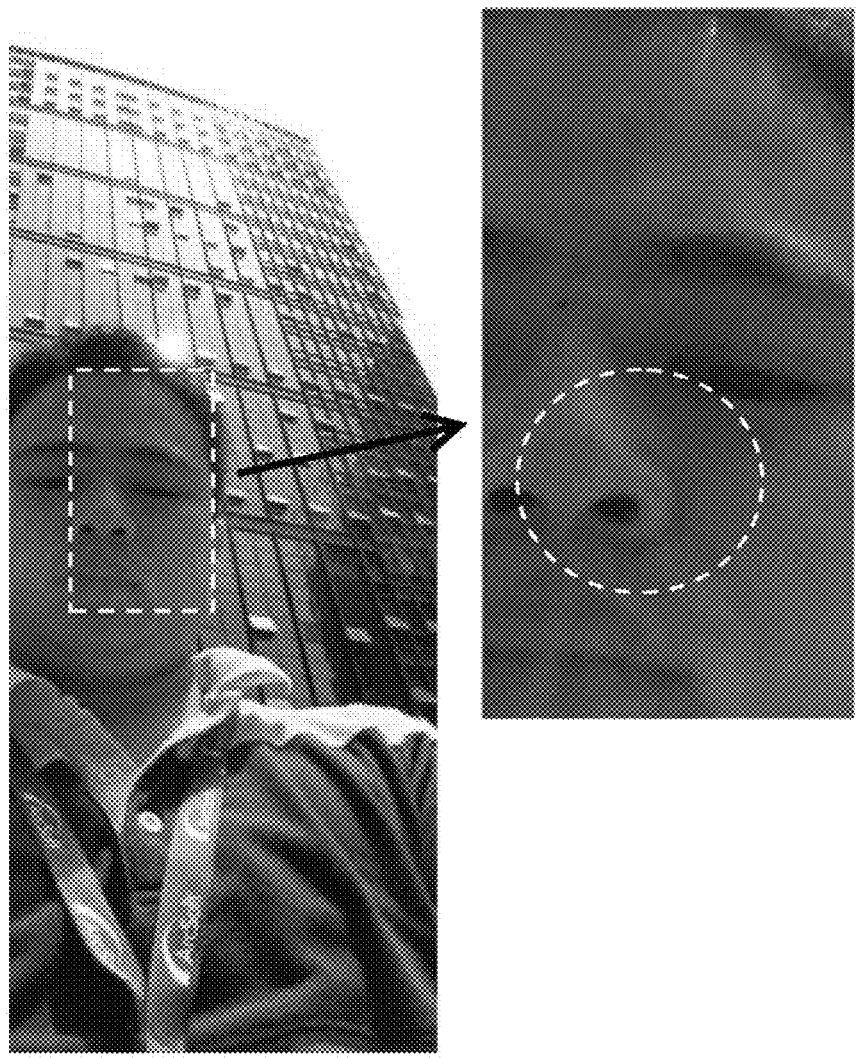
FIG. 8 shows the result of stitching together the overlap areas of two real-site images along the optimal stitching path according to the present invention.

(604) Once the mask diagram $I_{mask}$ is obtained, the overlap areas $I_a$ and $I_b$ are fused through a linear fusion or Laplace pyramid fusion algorithm. The linear fusion algorithm is the simpler of the two and is carried out by weighting the to-be-fused overlap areas $I_a$ and $I_b$ by the mask diagram $I_{mask}$ and then performing linear superimposition, and the result is a fused image $I_{blend} = I_a(1 - I_{mask}) + I_b I_{mask}$ as shown in FIG. 8. In the fused image $I_{blend}$, there is no misaligned image or ghost image on the nose (indicated by the dashed-line circle to the right of FIG. 8). Now that the focus of attention (i.e., the human face) in the resulting panorama has perfect visual effect, the image quality of the panorama is effectively enhanced.

Figure 1:
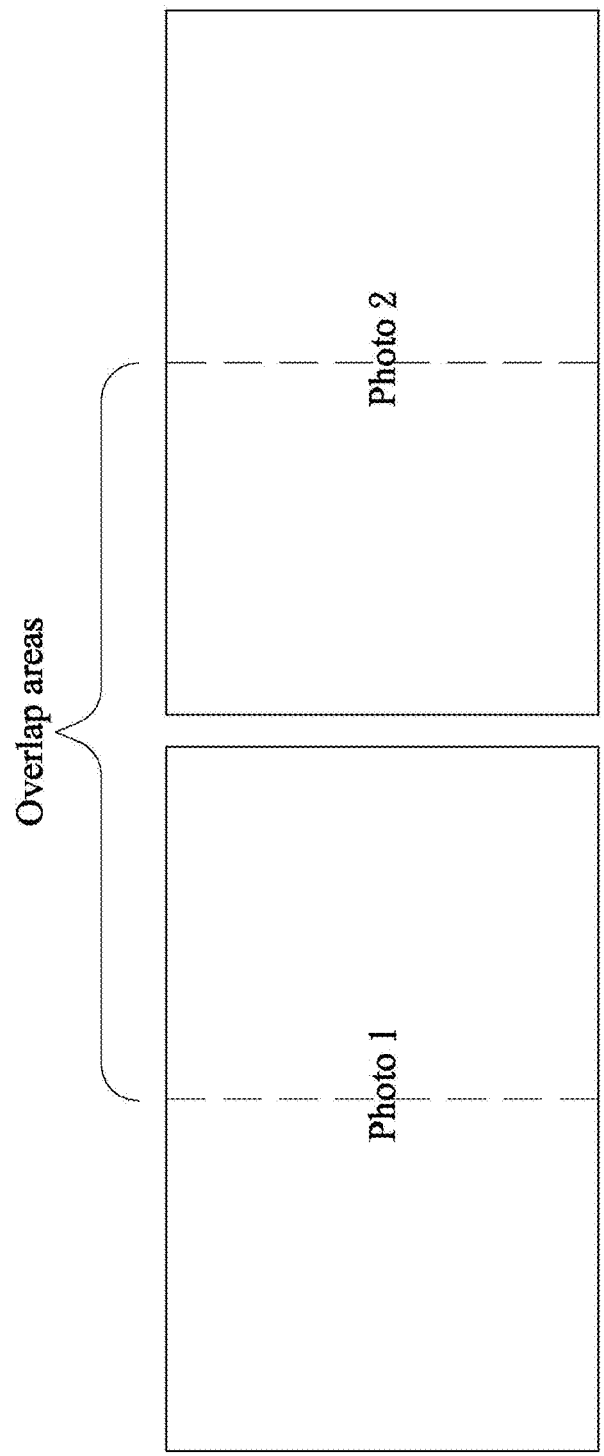
FIG. 1 schematically shows how images are stitched together in a conventional manner.
Figure 2:
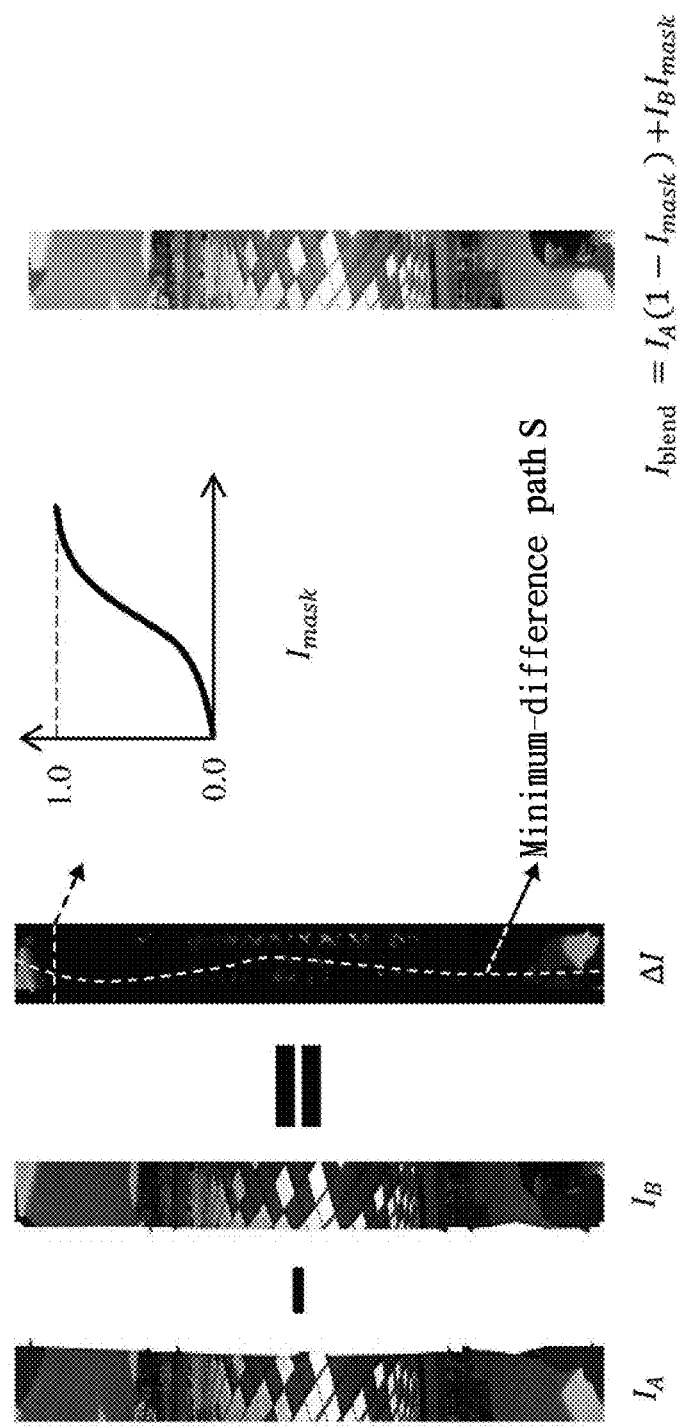
FIG. 2 schematically shows how the minimum-difference path is calculated for the overlap areas of two real-site images in a conventional manner.
Figure 3:
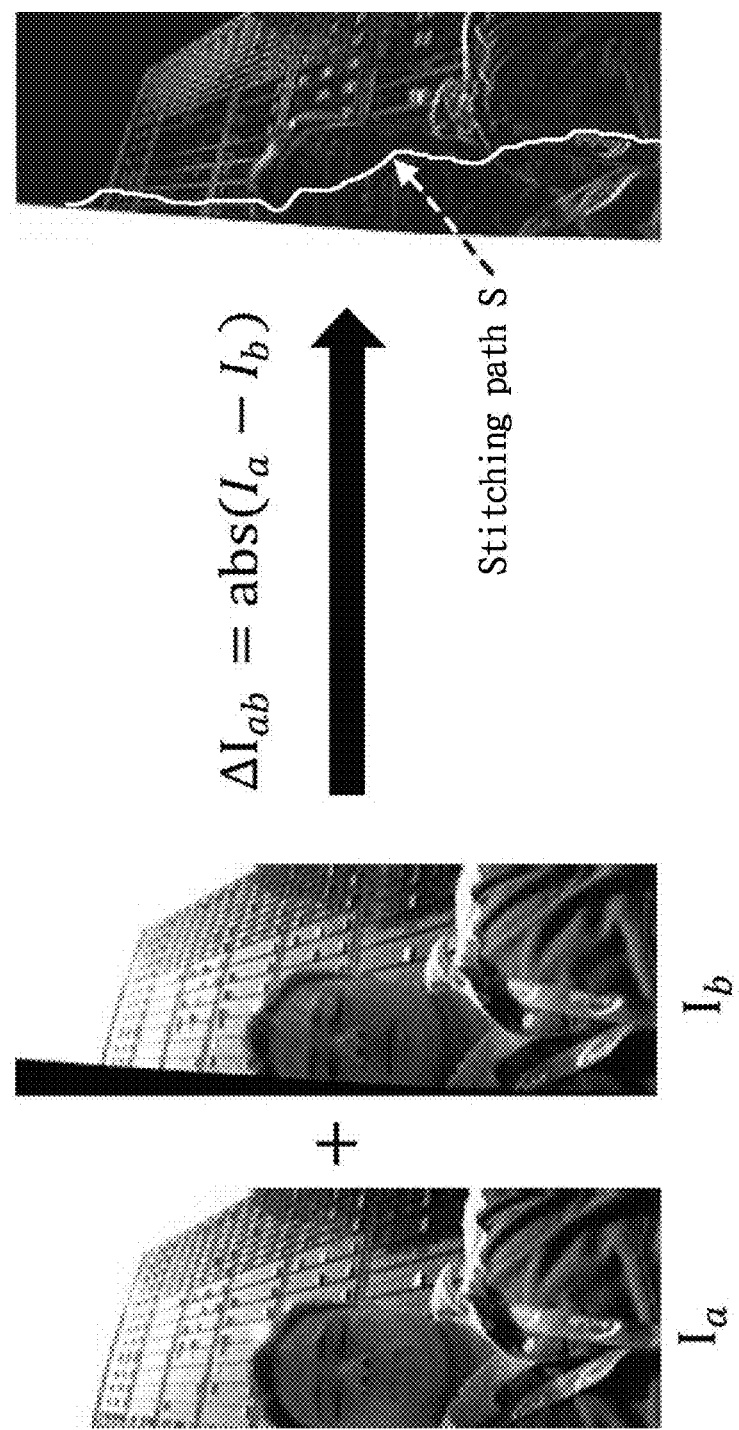
FIG. 3 is another figure showing how the minimum-difference path is calculated for the overlap areas of two real-site images in a conventional manner.
Figure 4:
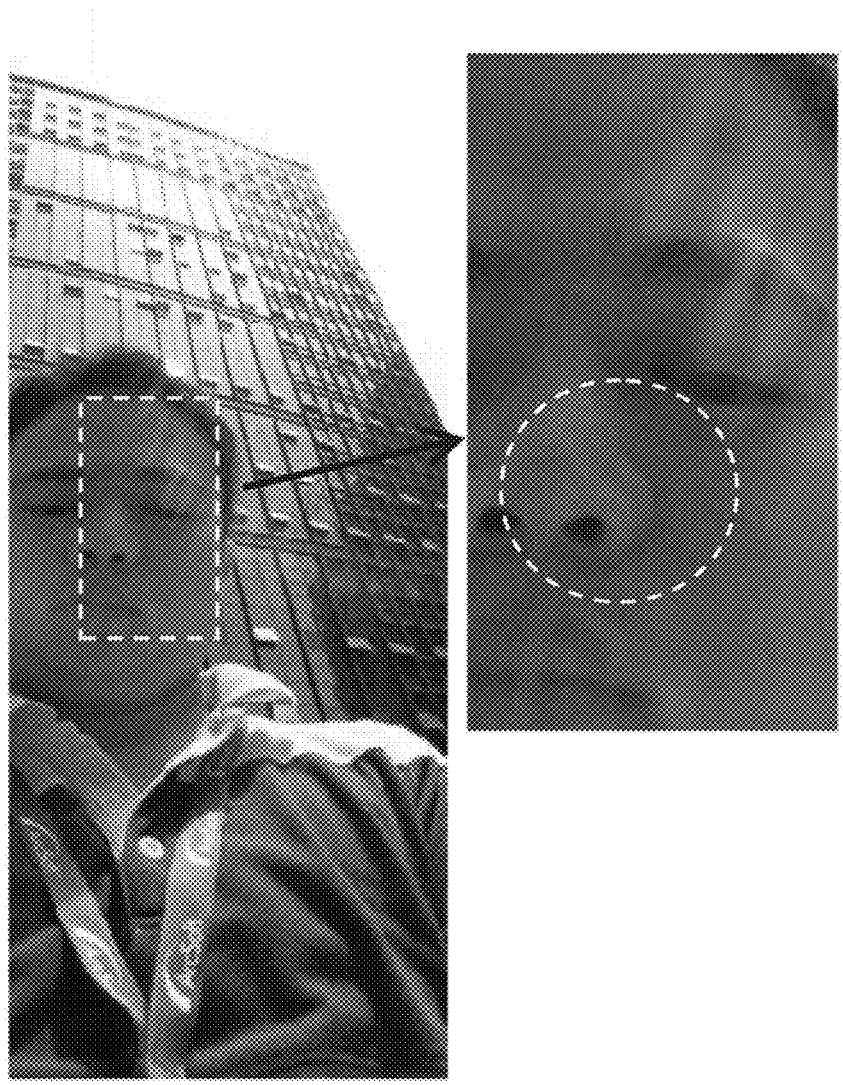
FIG. 4 shows the misaligned image or ghost image formed on the nose of a human face after the overlap areas of two real-site images are stitched together in a conventional manner.
Figure 5:
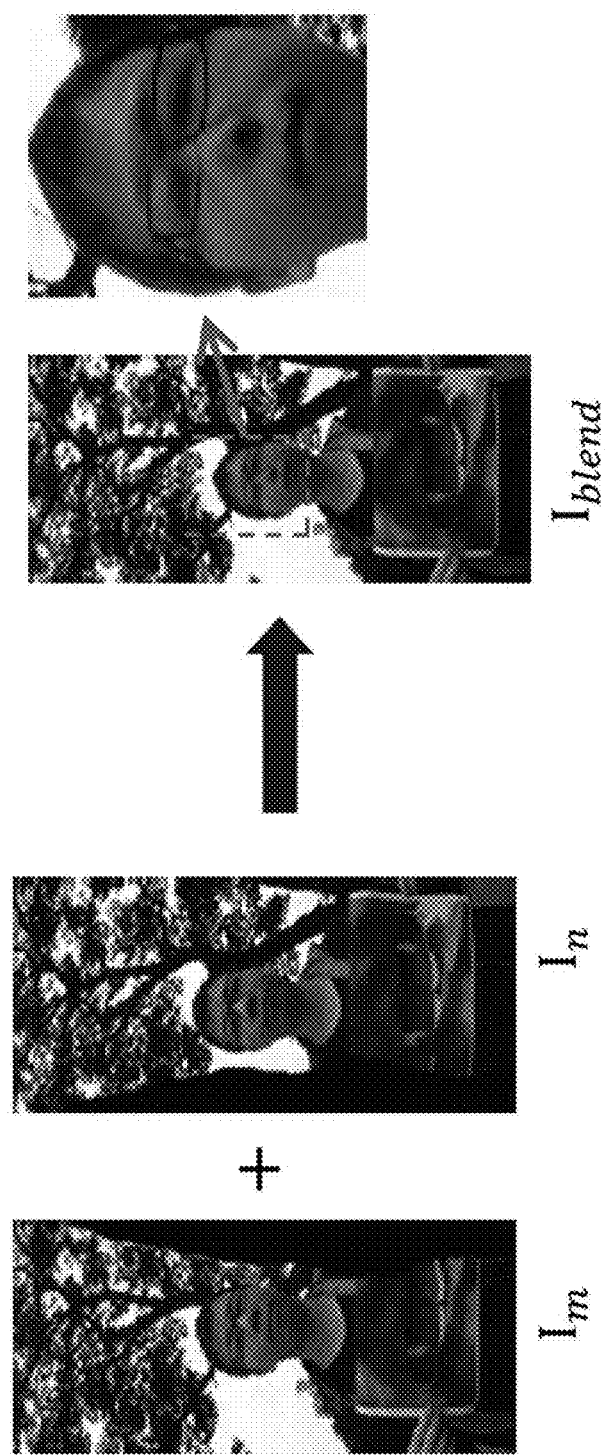
FIG. 5 shows the multiple misaligned images or ghost images formed on a human face after the overlap areas of two real-site images are stitched together in a conventional manner.
Figure 9:
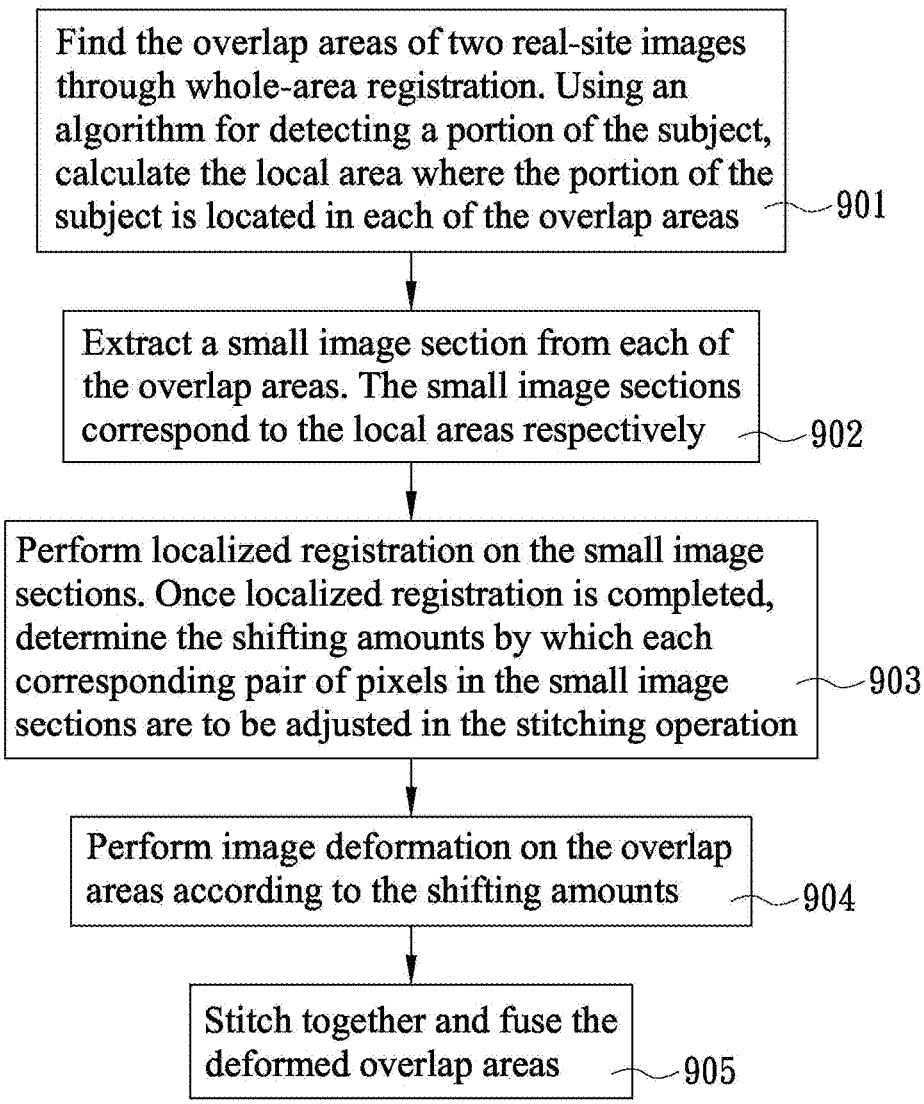
FIG. 9 is the flowchart of another embodiment of the present invention.

The foregoing is but one preferred embodiment of the present invention; implementation of the invention is by no means limited thereto. For instance, in cases where the overlap areas of the real-site images are relatively small but the image of the subject to be protected (e.g., a human figure) occupies the majority of each overlap area, a different approach of protection is desired because the optimal stitching path S obtained through the optimal path algorithm may have problem bypassing the image of the subject. Or in other cases, the stitching path may be set and invariable and therefore demand an alternative protection method. To solve these problems, the present invention performs the following steps (see FIG. 9) to protect the subject:

(901) To begin with, whole-area registration is conducted to find the overlap areas $I_m$ and $I_n$ of the two real-site images. If the overlap areas $I_m$ and $I_n$ thus found are directly stitched together and fused, matching errors and parallax, among other factors, are very likely to produce multiple detects on the subject in the resulting panorama, such as the misaligned images or ghost images in the fused image $I_{blend}$ of FIG. 5. In order to achieve perfect stitching of an attention-catching portion (e.g., a human face) of the subject in the finished panorama, an algorithm for detecting the portion of the subject (e.g., a human face detection algorithm) is used to calculate the local areas where the portion of the subject lies in the overlap areas $I_m$ and $I_n$ respectively.

Figure 10:
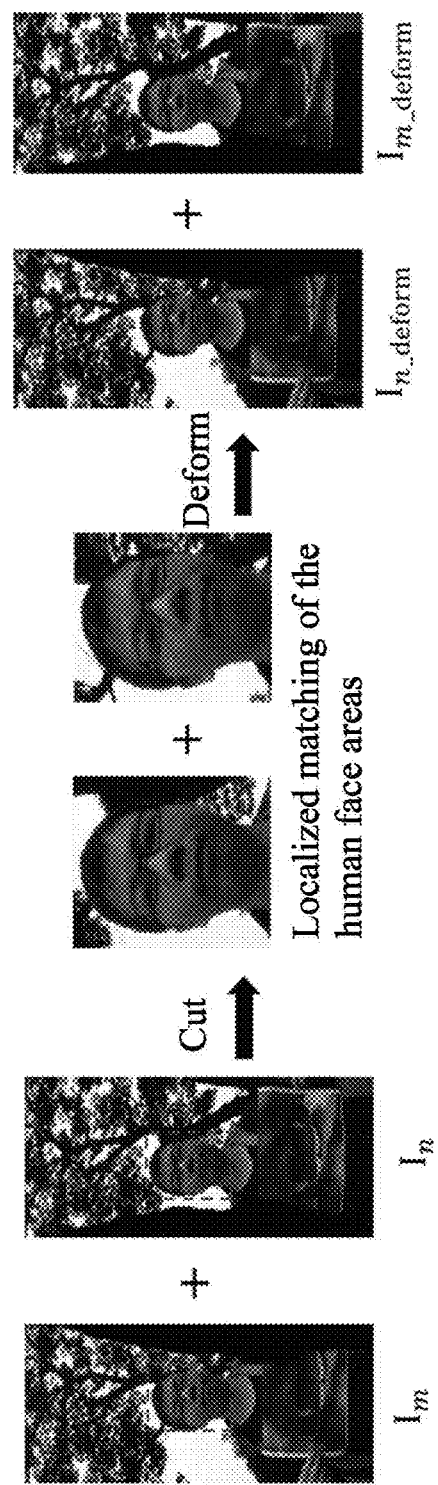
FIG. 10 schematically shows how the present invention performs localized registration and image deformation on the human face areas within the overlap areas of two real-site images.

(902) Referring to FIG. 10, a small image section is taken from each of the overlap areas $I_m$ and $I_n$. The small image sections correspond respectively to the local areas where the portion (e.g., the human face) of the subject lies.

(903) With continued reference to FIG. 10, localized registration (e.g., localized registration applicable to a human face) is performed on the small image sections through a block-matching algorithm based on minimization of a brightness error or an image registration algorithm based on the matching of characteristic points. After localized registration, the "shifting amounts" by which each corresponding pair of pixels in the two small image sections are to be adjusted in the following stitching process are determined. Since the aforesaid image matching algorithm and image registration algorithm are well known in the art and do not constitute a technical feature of the present invention, the details of the algorithms will not be further dealt with herein.

Figure 11:
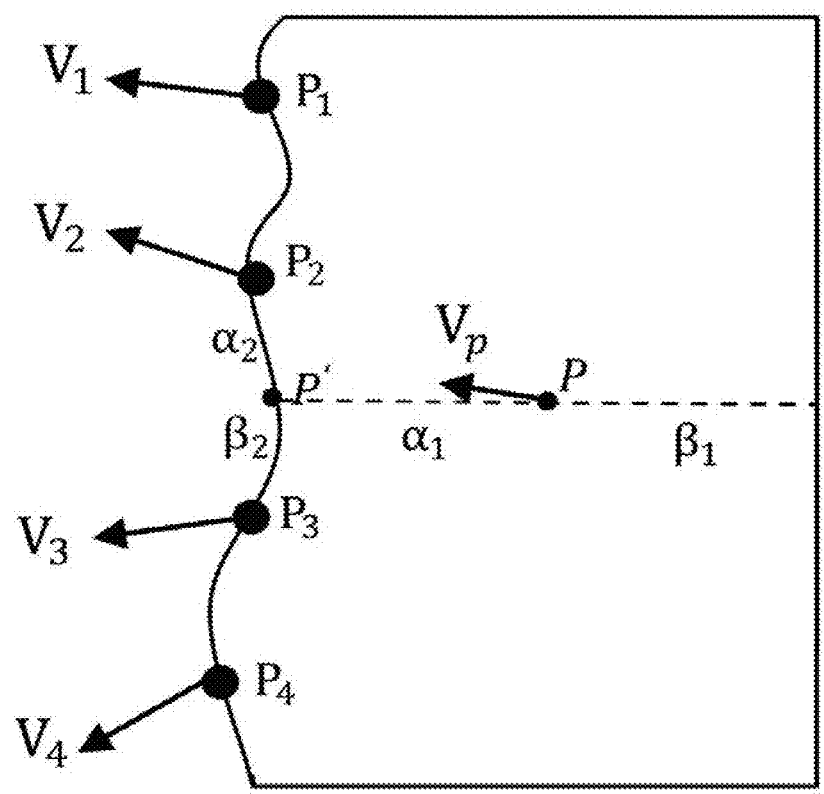
FIG. 11 schematically shows the mathematical model according to which the present invention performs image deformation on the overlap areas in FIG. 10 using the shifting amounts determined by localized registration of the human face areas.

(904) Image deformation is performed on the overlap areas $I_m$ and $I_n$ according to the shifting amounts determined in the previous step. Essentially, image deformation involves fine-tuning, or moving, each corresponding pair of pixels in the overlap areas $I_m$ and $I_n$ by the shifting amounts, or more particularly from their original positions to more consistent positions. The vector difference between each pair of original and more consistent positions is also referred to as "translation vector". In other words, the shifting amounts calculated in step (903) by which adjustment is to be made are the translation vectors of the subject's respective images (e.g., images of a human figure) in the overlap areas $I_m$ and $I_n$. It should be pointed out that, before performing image deformation on the subject's images (e.g., images of a human figure), the present invention defines the to-be-deformed overlap areas $I_m$ and $I_n$ to ensure that only images within the to-be-deformed areas need to be deformed, and that images outside the to-be-deformed areas do not. While the size of the to-be-deformed areas can be arbitrarily set, it is generally desirable that the size of the to-be-deformed areas can prevent the deforming process from leaving noticeable marks of deformation behind. More specifically, referring to FIG. 11, $V_1$, $V_2$, $V_3$, and $V_4$ are the translation vectors of four points $P_1$, $P_2$, $P_3$, and $P_4$ on the optimal stitching path S respectively, and the translation vector $V_P$ of any point P in the to-be-deformed area can be determined according to the translation vectors $V_1$, $V_2$, $V_3$, and $V_4$. First, a horizontal line passing through the point P is set (as indicated by the dashed line in FIG. 11). The distance from the point P to the optimal stitching path S is $\alpha_1$. The distance from the point P to an edge of the to-be-deformed area is $\beta_1$. The intersection P' of the horizontal line and the optimal stitching path S is between $P_2$ and $P_3$. The distances from P' to $P_2$ and to $P_3$ are $\alpha_2$ and $\beta_2$ respectively. Thus, the translation vector $V_P$ of P can be obtained by a linear combination of $V_2$ and $V_3$ as:

$$V_P = \left( \frac{V_3 \alpha_2}{\alpha_2 + \beta_2} + \frac{V_2 \beta_2}{\alpha_2 + \beta_2} \right) \frac{\beta_1}{\alpha_1 + \beta_1},$$

and the deformed images $I_{m\_deform}$ and $I_{n\_deform}$ of the overlap areas $I_m$ and $I_n$, subsequently obtained as shown in FIG. 10.

Figure 12:
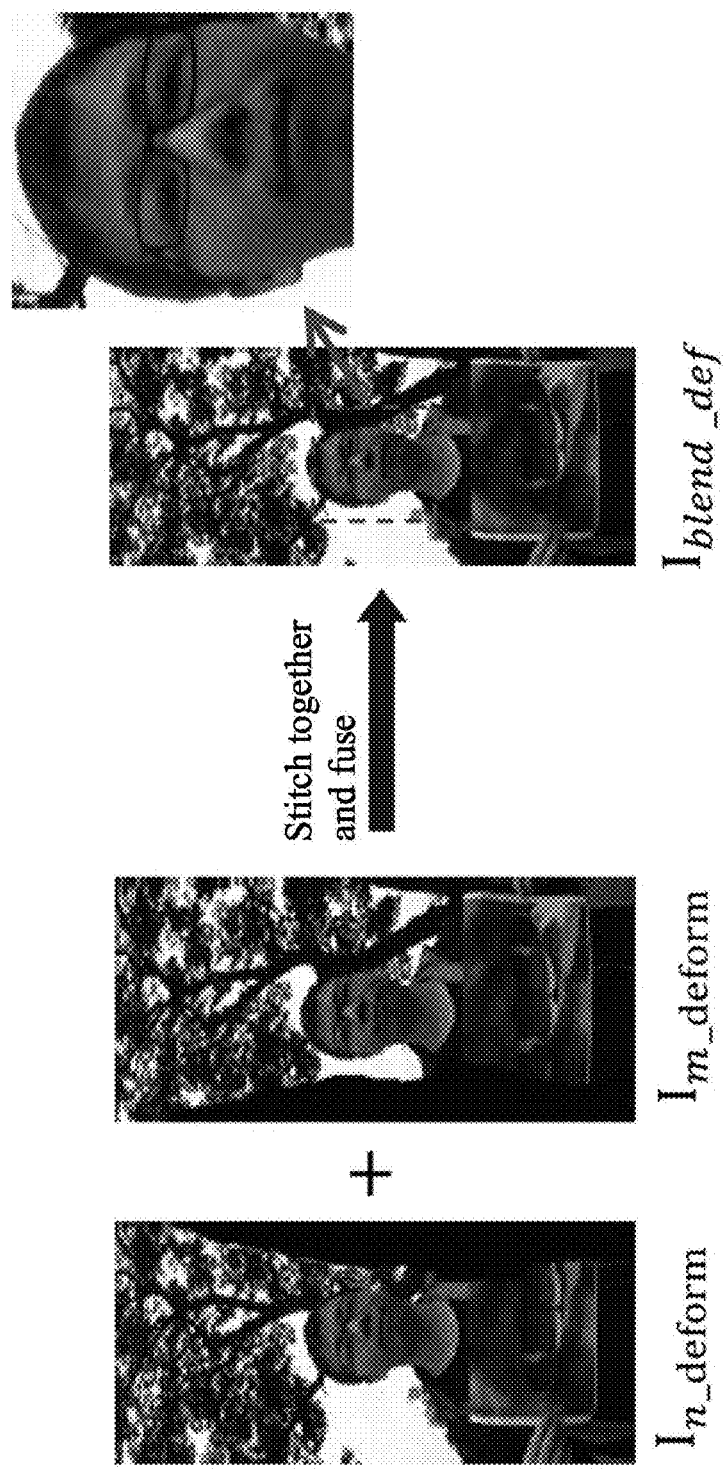
FIG. 12 schematically shows how the present invention fuses the deformed overlap areas in FIG. 10.

(905) Lastly, the deformed images $I_{m\_deform}$ and $I_{n\_deform}$ are stitched together and fused to produce the final image $I_{blend-def}$ as shown in FIG. 12. After the stitching and fusing process, each corresponding pair of pixels in the overlap areas $I_m$ and $I_n$ are practically perfectly aligned, and the resulting panorama is almost perfect, without misaligned images or ghost images on the subject of the panorama. The focus of attention in the panorama, therefore, continues to have perfect visual effect. In fact, the details of the subject's image remain nearly perfect when magnified and may even move those who are watching them. Such a panorama is truly worth keeping for a lifetime.

It should be pointed out that localized registration is used in various conventional image stitching methods but is applied in those methods to the entire to-be-stitched areas (i.e., the overlap areas $I_m$ and $I_n$), thus incurring a large amount of calculation. In the present invention, by contrast, localized registration is applied only to the attention-compelling local areas (e.g., areas showing a human face) within the subject's areas (areas showing a human figure). Hence, not only is the required amount of calculation substantially reduced, but also the shifting amounts determined in step (903) can be used to deform the subject's areas to ensure that the subject's areas are perfectly stitched together.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method for ensuring perfect stitching of a subject's images in a real-site image stitching operation, the method being applied to an electronic device and comprising the steps, to be performed in the stitching operation by the electronic device after reading at least two real-site images which are taken respectively of different parts of a same site and each of which has an overlap area including an image of a common subject to be protected, of:

calculating the subject's respective positions in the overlap areas via a subject detection algorithm, and assigning a greatest difference value to an area where the subject is located in a difference diagram of the overlap areas;

determining an optimal stitching path in the difference diagram via an optimal path algorithm, wherein the optimal stitching path does not pass through the area where the subject is located;

constructing a mask diagram by assigning a predetermined value to each pixel on the optimal stitching path in the difference diagram such that the farther a said pixel in the difference diagram and on a first side of the optimal stitching path is from the optimal stitching path, the greater the pixel's value, and the farther a said pixel in the difference diagram and on an opposite second side of the optimal stitching path is from the optimal stitching path, the smaller the pixel's value; and fusing the overlap areas via an image fusing algorithm and with the mask diagram serving as a weight, thereby combining the real-site images into a panorama.

2. The method of claim 1, wherein the optimal path algorithm is a dynamic programming or graph cut algorithm.

3. The method of claim 2, wherein the image fusing algorithm is a linear fusion or Laplace pyramid fusion algorithm.

4. The method of claim 3, wherein the localized registration uses a block-matching algorithm based on minimizing a brightness error or an image registration algorithm based on matching characteristic points.

5. The method of claim 4, wherein the predetermined value is 0.5 such that the farther a said pixel in the difference diagram and on the first side of the optimal stitching path is from the optimal stitching path, the closer to 1.0 the pixel's value, and the farther a said pixel in the difference diagram and on the second side of the optimal stitching path is from the optimal stitching path, the closer to 0.0 the pixel's value.

6. The method of claim 5, wherein the subject is a human face.

7. The method of claim 5, further comprising the steps of:
finding the overlap areas of the two real-site images via whole-area registration;
calculating a local area where a portion of the subject is located in each of the overlap areas, via an algorithm for detecting the portion of the subject;
extracting a small image section from each of the overlap areas, wherein the small image sections correspond to the local areas respectively;

performing localized registration on the small image sections, and after the localized registration is completed, determining shifting amounts by which each corresponding pair of pixels in the two small image sections are to be adjusted in the stitching operation;
performing image deformation on the overlap areas according to the shifting amounts, thereby forming deformed overlap areas; and
stitching together and fusing the deformed overlap areas to produce the panorama.

8. The method of claim 7, wherein the image deformation comprises displacing each corresponding pair of pixels in the overlap areas from their original positions to more consistent positions according to the shifting amounts, and a vector difference between each said original position and a corresponding said more consistent position is a translation vector.

9. The method of claim 8, wherein the image deformation comprises determining a said translation vector $V_P$ of any point P in the overlap areas according to four said translation vectors $V_1$, $V_2$, $V_3$, and $V_4$, which correspond to four points $P_1$, $P_2$, $P_3$, and $P_4$ on the optimal stitching path respectively, and the translation vector $V_P$ of the point P is a linear combination of the translation vectors $V_2$ and $V_3$ as shown below, in order to form the deformed overlap areas:

$$V_P = \left( \frac{V_3 \alpha_2}{\alpha_2 + \beta_2} + \frac{V_2 \beta_2}{\alpha_2 + \beta_2} \right) \frac{\beta_1}{\alpha_1 + \beta_1},$$

where $\alpha_1$ is a distance from the point P to the optimal stitching path, $\beta_1$ is a distance from the point P to an edge of a corresponding to-be-deformed area, $\alpha_2$ is a distance from the point $P_2$ to an intersection P' between the optimal stitching path and a horizontal line passing through the point P, the intersection P' lying between the points $P_2$ and $P_3$, and $\beta_2$ is a distance from the point $P_3$ to the intersection P'.

10. The method of claim 9, wherein the subject is a human figure, and the portion of the subject is a human face.

* * * * *